F. H. WEBSTER.
MIXING MACHINE.
APPLICATION FILED SEPT. 21, 1914.

1,296,445.

Patented Mar. 4, 1919.
6 SHEETS—SHEET 1.

F. H. WEBSTER.
MIXING MACHINE.
APPLICATION FILED SEPT. 21, 1914.

1,296,445.

Patented Mar. 4, 1919.
6 SHEETS—SHEET 6.

Witnesses
Mary J. Hill
Gertrude Dicke

Inventor
Frederick H. Webster

UNITED STATES PATENT OFFICE.

FREDERICK H. WEBSTER, OF OAKLAND, CALIFORNIA, ASSIGNOR OF ONE-HALF TO CHARLES L. BROWN, OF SAN FRANCISCO, CALIFORNIA.

MIXING-MACHINE.

1,296,445.  Specification of Letters Patent.  Patented Mar. 4, 1919.

Application filed September 21, 1914. Serial No. 862,712.

*To all whom it may concern:*

Be it known that I, FREDERICK H. WEBSTER, residing in Oakland, in the county of Alameda and State of California, have invented new and useful Improvements in Mixing-Machines, of which the following is a description.

This invention relates to continuous mixing tubes, and an object of the invention is to improve the mixture of the substances acted upon by carrying out certain important functions.

My more specific object is to produce a mixer whose action on all the constituent materials of concrete shall be alike and positive, comprising the constantly recurring selection of portions of the mass being mixed and the placing of said portions in new relations in the mass. This object is accomplished by moving the portions in a geometrical progression according to the principles of fine grinding, and in so moving and rubbing the materials as to expel entrained air as far as possible.

Another object of the invention is to produce a mixer which will have a considerable quantity of material under treatment, so the time of rubbing and mixing may be increased without a reduction in capacity.

In the drawing in which the same numeral is applied to the same portion throughout:

Figure 5:
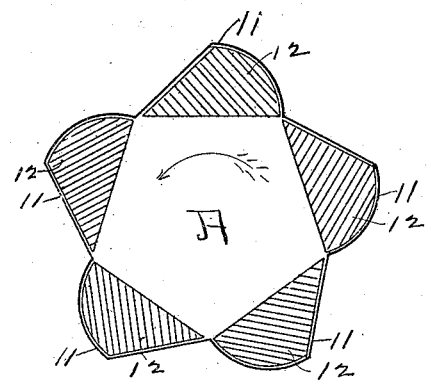
Figure 4:
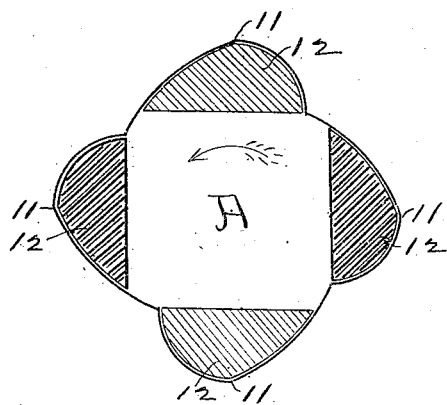

Figs. 4 and 5, both represent a transverse sectional view of the mixing chamber as it may be constructed as will hereinafter appear, taken on any line occurring between the division plates.

Figure 6:
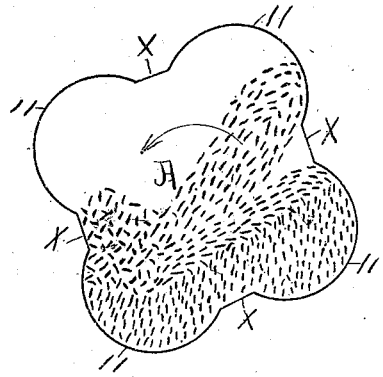

Fig. 6, is illustrative (so far as may be) of the transverse motion given materials in the mixing chamber, when mixing chamber is in rotation as will hereinafter appear.

Figure 2:
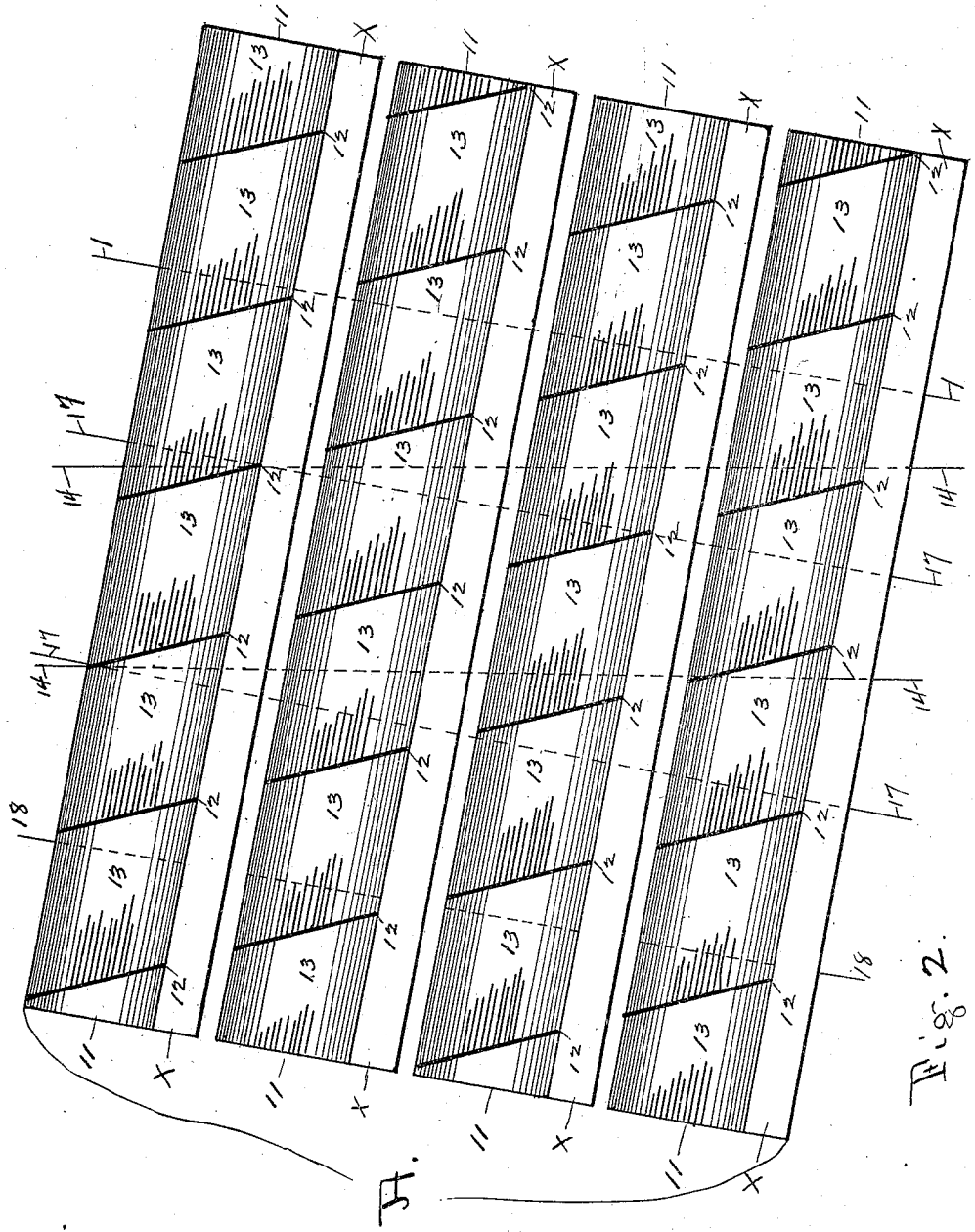
Fig. 2 is a plan view of the several sections of the mixing tube shown separated from each other and looking toward their inner sides, the vertical arrangement being the same as Fig. 1.
Figure 7:
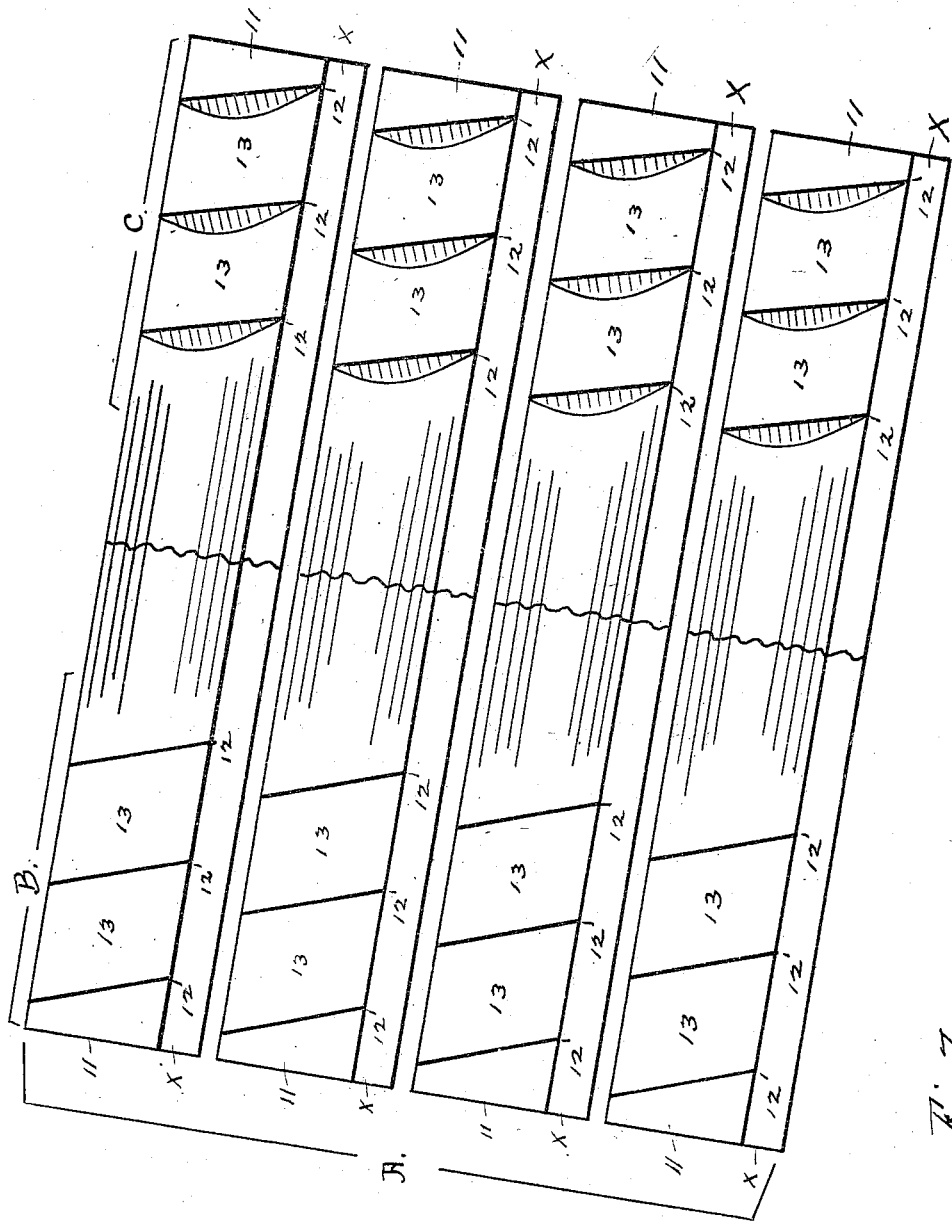
Figure 8:
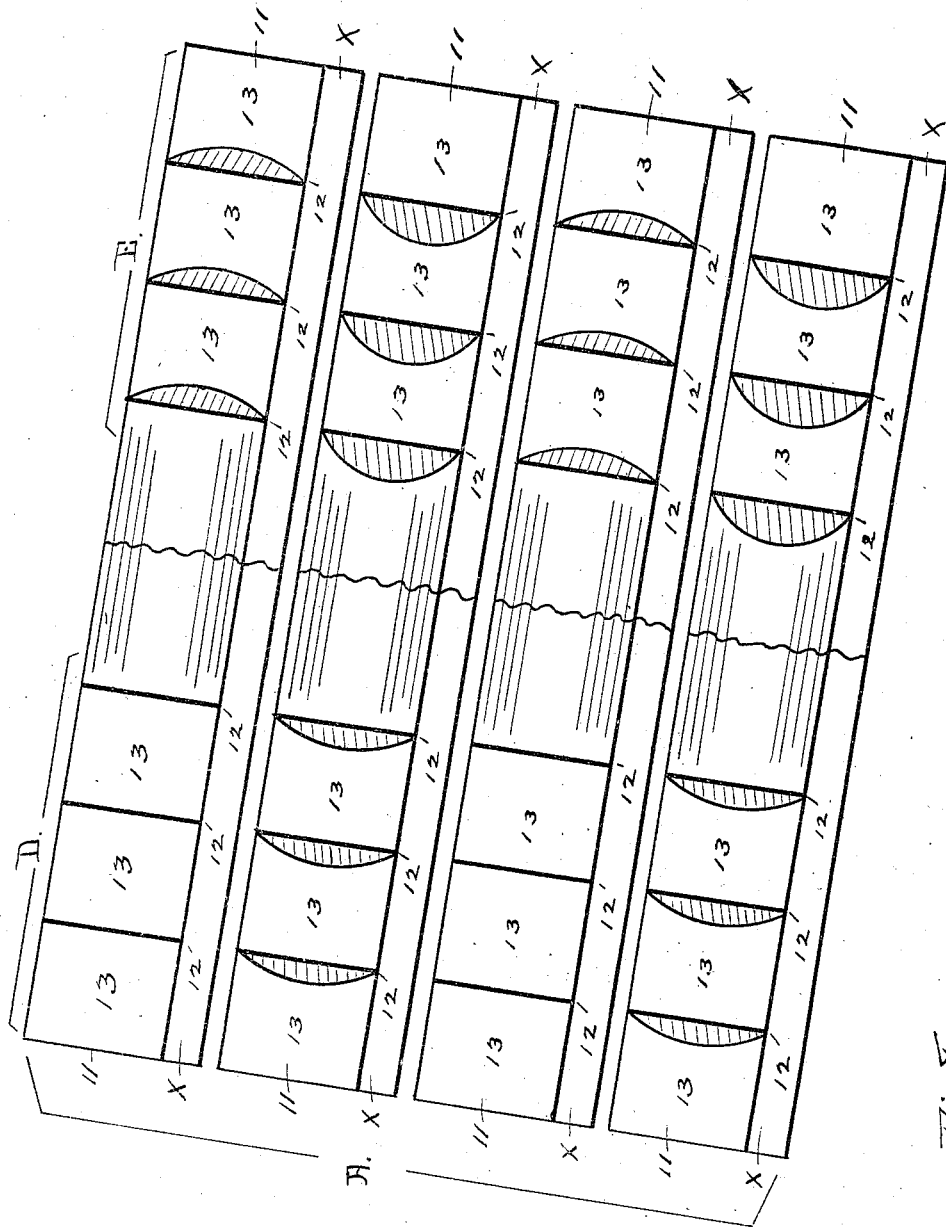
Figure 9:
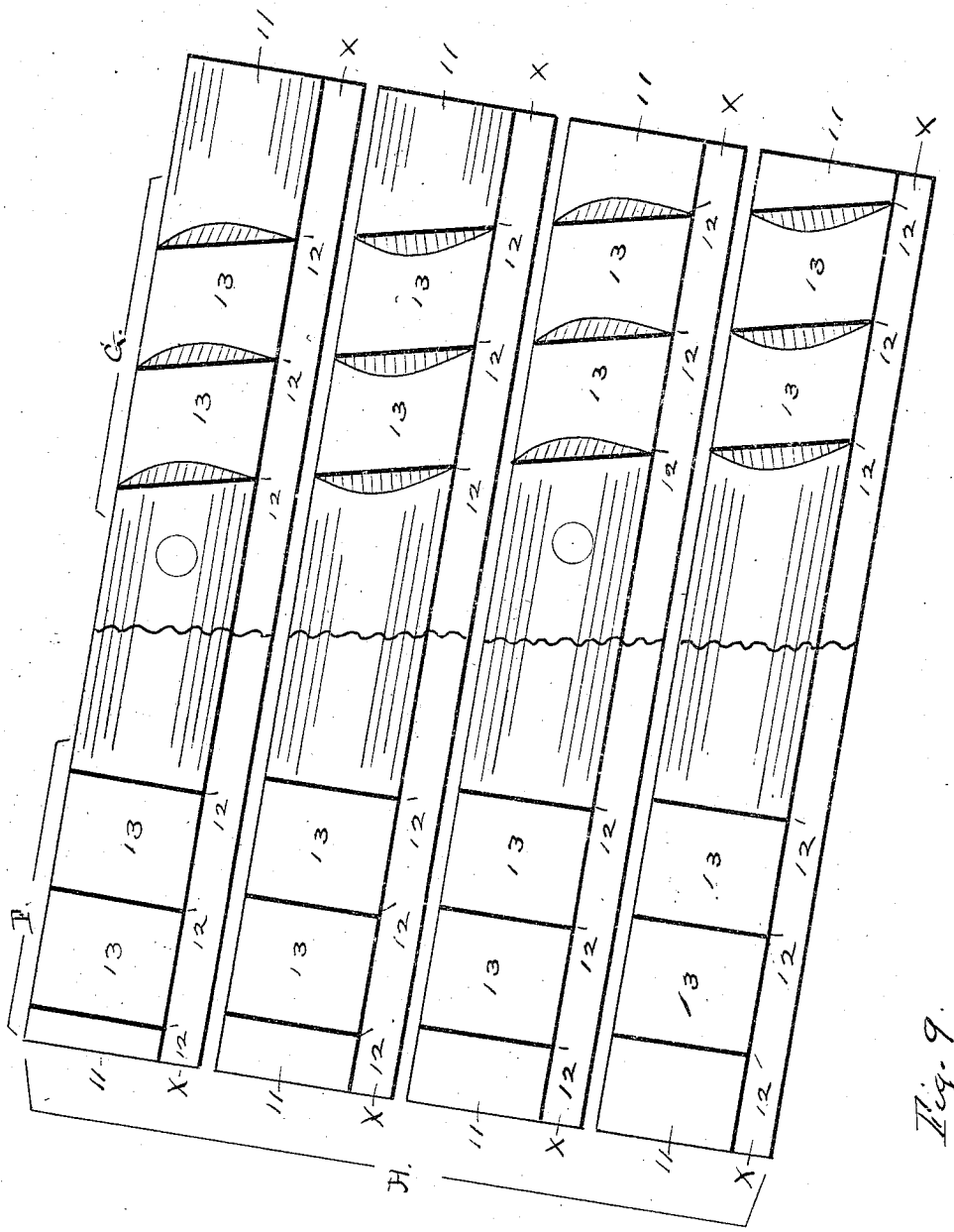

Figs. 7, 8 and 9 are each views similar to Fig. 2 in arrangement intended to show mixing chamber sections in which the division plates are differently arranged, each figure showing two arrangements.

Figure 1:
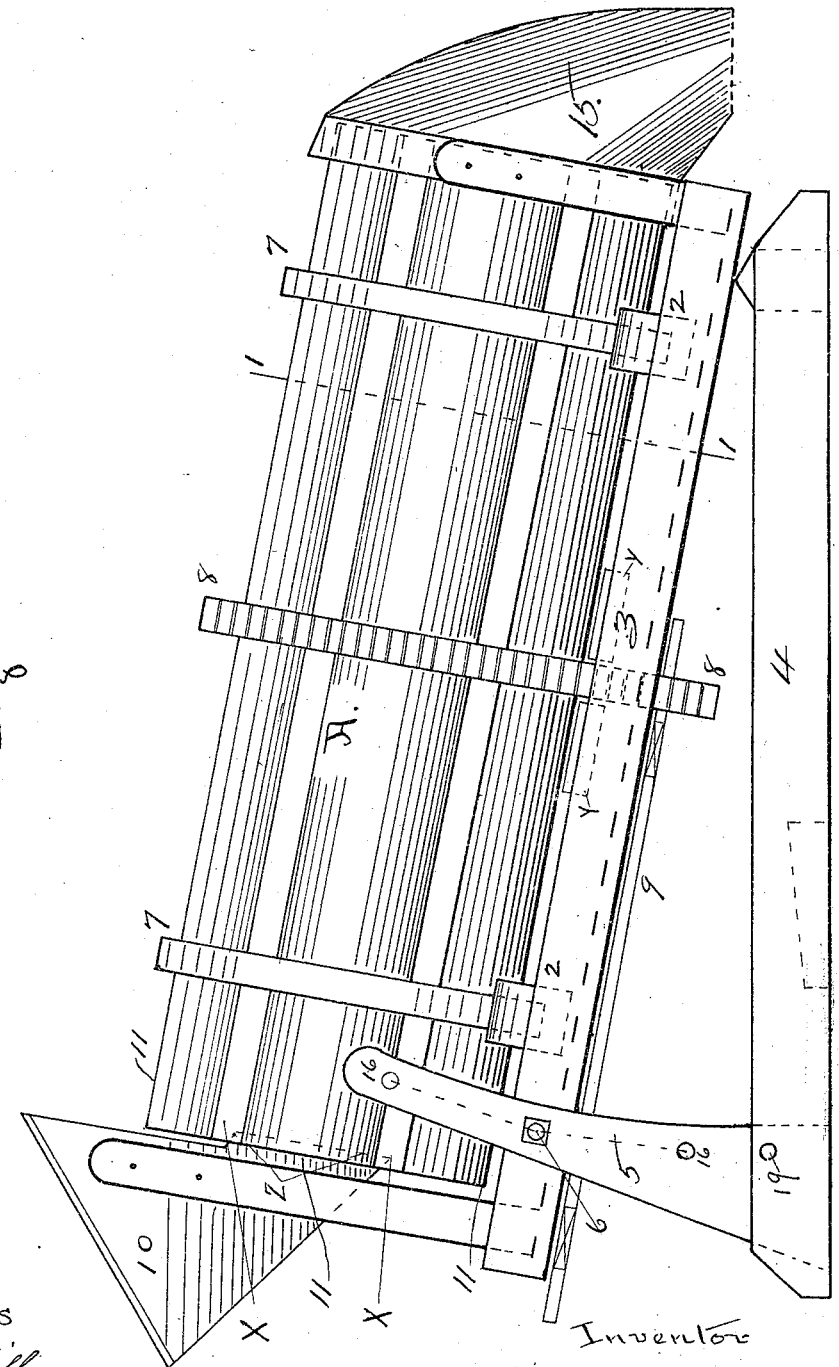
Figure 1 represents a side elevation of the mixer.

In the drawings A represents a cylindrical mixing chamber or tube of any suitable diameter and length which may be mounted or supported in any well known manner or as illustrated in Fig. 1 of the drawings. The cylindrical mixing chamber A is surrounded by two ring wheels 7 and is carried on rollers 2—2, supported on skeleton frame 3. The frame 3 may be supported on skids 4 and bolts 6 carried by standards 5. The mixing tube is revolved by gear wheels 8—8', from shaft 9, which may receive motion at suitable speed. Y and Y are idle wheels to receive the thrust.

In operation the materials to be mixed are combined and fed into the hopper 10 from where they enter the mixing tube by an inlet Z.

Figure 3:
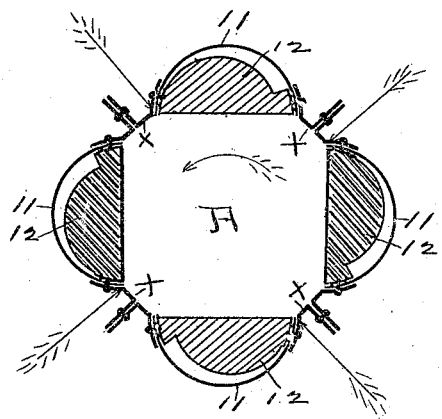
Fig. 3, represents a transverse sectional view of the mixing chamber taken on the dotted line 1—1 in Figs. 1 and 2.

By reference to Figs. 2 and 3 in which the division plates that cross the longitudinal valleys 11, are marked 12, it will be seen that the inside outline of the mixing chamber A consists very largely of cups or cavities as well as valleys. Or to further explain the insertion of the division plates 12 at an oblique angle has transformed the longitudinal valleys 11 into many shorter valleys, these shorter valleys are essentially cups or cavities that are arranged helically in the peripheral wall of chamber A. Calling these short valley cups, I have marked them 13 in Fig. 2. The spaces between the valleys 11, I have marked X. Division plates 12 may or may not be in complete contact with the valleys 11, in cases only for support as shown in Fig. 3; this constitutes a sluice-way between said members.

From Fig. 2 it can be seen that the mass on entering the revolving mixing chamber A is handled by cups 13 in small batches. In a general way the handling consists of picking up material in batches at a low part of chamber A and carrying it up in batches on the rising side of said chamber to where it is released; a part by sliding and rolling and a part by being dumped out of the ascending cups; arriving.

To further explain, looking at a cross-section view of chamber A in operation with material in it, we find said material in three separate and distinct conditions, *i. e.*, a part dormant in the device and moving with the device, a part rolling over and over on itself, and a part falling clear. In describing this manifold manipulation I will separate it into two classes; one, latitudinal and one, longitudinal, and for convenience assume chamber A to be in operation in a horizontal position.

In the latitudinal handling; the cups 13, having picked up a load (overload), rising, carry the load till the rear portion (in relation to travel) is discharged by being thrown over upon the mass in the bottom of the tube. The mass then lands, arriving in other cups 13, at the instant at a lower altitude—and in combination with this function of cups 13, is their other function, i. e. of causing the forward travel of the mass. The spilled portion rolls on material being carried up. These reverse movements set up a rolling and tumbling together, with a wave-like motion of said material; a very efficient principle in fine grinding. This rolling wave is distinctly an internal movement.

The material thrown out of the cups passes over the rolling wave and arrives against the reversely moving peripheral wall of chamber A with force, setting up the coarse grinding principle exhibited in several reduction machines.

The sliding masses and the dumped masses are in constant alternation.

With chamber A in rotation at a suitable speed there is not an indiscriminate flowing of the mass to the lowest altitude in the mixer, with the attendant disabilities. All the mass is handled twice at each revolution which, remembering the speed such mixers may be operated at gives much manipulation, within a given time—water has not time to independently circulate; it is carried in the general circulation.

The longitudinal handling is set up by the division plates 12 whose angle to the tube axis governs the mass movement. The angle of the cups may be more or less oblique to the axis and will be made such as detains the mass in the tube for the desired time.

Reference is here made to Fig. 2 where division plates 12 cross valleys 11 obliquely and rise from said valleys vertically and to Fig. 9, section G, where division plates 12 cross valleys 11 obliquely and rise in said valleys obliquely—the obliquity of the rise being in opposite directions in alternate valleys. The obliquity of the rise may be all one way and in either direction.

With the device in operation the area of the inlet Z is maintained at a size only sufficient to admit the desired amount of material; hence air is only admitted into chamber A (at feed end) as it is entrained in the feed. Air adhering to material is ground off, and entrained air being set in motion and seeking the way of least resistance, goes to the portion of chamber A transiently unoccupied by material.

It is apparent from Figs. 1 and 2, wherein the dotted lines 14—14 and 14—14 in Fig. 2 are vertical, that by operating the chamber A as therein shown, gravity will lend aid in the conveying movement, increasing the capacity and at the expense of the "time of mixing". To increase the time of mixing (as against such mounting); remove bolts 6 in standards 5 and lower frame 3 so bolts 6 can be inserted in bolt holes lower 16 in standards 5 when chamber A will be horizontal and the dotted lines 17—17 and 17—17 in Fig. 2 will be vertical. A further increase in the time of mixing will be accomplished as the oblique angle at which division plates 12 cross the valleys 11 in Fig. 2 is changed, so as to approach nearer to a right angle. The plates 12 may be inclined rearwardly as in the valleys marked with a circle, Fig. 9, if it is desired to increase the time of mixing.

By reason of the large cross section area of load, such chambers A can handle and set up the described functions; the longitudinal movement may be made very slow and yet give a large product, within feasible size of chamber A.

Having thus shown the principles of my invention in my preferred form, let us look at the device again and we at once see other forms in which it may be applied.

The shape of the parallel valleys 11 need not be one-half of a circle, nor their number four. Many shapes of valleys and irregular shaped valleys and various numbers of valleys will cause the functions described. See Figs. 4 and 5 illustrating two of the many.

Also if Figs. 4 and 5 be rotated oppositely to the way indicated, the periphery speed may be greater, causing still more movement to material in a unit of time.

The valleys 11 need not be spaced apart; they may join. Again referring to Figs. 4 and 5.

Division plates 12 may extend only partially across valleys 11, as shown in Fig. 4, or division plates 12 may be less in extent than shown in Fig. 4, extending say from the top of valley 11 on its rear side (in relation to travel) and on a line so they will "fade away" against the opposite side of said valley, say two-thirds way across.

Division plates 12 may cross valleys 11 at oblique angles and be alined around the peripheral wall in circles, as shown in Fig. 7, section B, or they may rise from the valley (11) bottom at an oblique angle—as shown in Fig. 7, section C.

Division plates 12 may cross the valleys 11 at right angles thereto and be alined in peripheral wall in circles, and in alternate valleys 11 rise from the bottom of said valleys vertically and at oblique angles—as shown in Fig. 8, section D.

Division plates 12 may cross the valleys 11 at right angles thereto and be alined in peripheral wall in circles, and rise at oblique angles in valleys (11) so that in alternate valleys (11) the division plates 12 are inclined in opposite directions and at different angles as in Fig. 8, section E.

Division plates 12 may cross the valleys 11 at right angles thereto, rising from said valley bottoms at right angles and be alined in peripheral wall of chamber in step sequence as shown in Fig. 9, section F.

This invention will transport concrete and mix it in transit. I wish it understood however that I do not limit myself to specific use; within its adaptations I have found said device will mix to essential homogeneity any loose mass (size of particles suitable to size of machine); or fluids.

Having thus described my invention what I claim and desire to secure by Letters Patent is:

1. A mixing drum comprising a chamber with cups in its peripheral wall, and having division plates in said cups; said division plates being inclined, substantially as described.

2. A mixing drum comprising a chamber with longitudinal cavities therein, forming cups in its peripheral wall, and having divisional plates in said cups spaced from said wall forming subterfluous passages.

3. A mixing drum having its shell corrugated in cross section forming cups and provided with inclined division plates in said cups spaced from said shell forming subterfluous passages as described.

4. A mixing drum comprising a chamber with longitudinal cavities therein forming cups in its peripheral wall, and having divisional plates in said cups extending partially across said cups, substantially as described.

5. A mixing drum comprising a chamber with cups in its peripheral wall, and having perpendicular division plates in said cups; said division plates being stepped in their sequence in said drum, substantially as described.

6. A mixing tube having depressions in its peripheral wall forming longitudinal cups and furnished with division plates therein, dividing said cups into manifold cups, substantially as described.

7. A mixing tube closed at one end except an inlet; said tube having depressions in its peripheral wall forming longitudinal cups and having divisional plates in said cups, set therein substantially as described.

8. A mixing machine comprising a revoluble drum having longitudinally extending recesses, and a series of division plates in the several recesses, substantially as described.

9. A mixing machine comprising a drum having a series of longitudinally extending recesses therein, means to support said drum for rotation in an inclined position, means to rotate the drum, and a series of partitions inclined to the axis of the drum in each recess.

10. A mixing machine comprising a revoluble inclined drum having pockets extending throughout its length, a series of spirally arranged partitions in the several pockets, and means to rotate the drum.

In testimony whereof, I have hereunto set my hand in the presence of the two subscribing witnesses.

FREDERICK H. WEBSTER.

Witnesses:
MELLA S. NISBET,
J. F. BETHEL.